United States Patent
Breithaupt et al.

(10) Patent No.: US 9,070,512 B2
(45) Date of Patent: Jun. 30, 2015

(54) ELECTROPHORETICALLY DEPOSITED CATHODE CAPACITOR

(75) Inventors: Steve Breithaupt, North Bennington, VT (US); Nissim Cohen, Tivon (IL); Alex Eidelman, Beer Sheva (IL); Reuven Katraro, Rishon Le Zion (IL)

(73) Assignee: Vishay Sprague, Inc., Sanford, ME (US)

( * ) Notice: Subject to any disclaimer, the term of this patent is extended or adjusted under 35 U.S.C. 154(b) by 0 days.

(21) Appl. No.: 12/052,251

(22) Filed: Mar. 20, 2008

(65) Prior Publication Data

US 2009/0237863 A1 Sep. 24, 2009

(51) Int. Cl.
*H01G 9/00* (2006.01)
*H01G 9/042* (2006.01)

(52) U.S. Cl.
CPC .............. *H01G 9/0425* (2013.01); *Y10T 29/417* (2015.01)

(58) Field of Classification Search
CPC .................................................... H01G 9/0425
USPC .................. 361/516–517, 532–535; 29/25.03
See application file for complete search history.

(56) References Cited

U.S. PATENT DOCUMENTS

| | | | |
|---|---|---|---|
| 2,834,926 A * | 5/1958 | Booe | 361/507 |
| 2,871,425 A * | 1/1959 | Burnham | 361/504 |
| 2,908,849 A * | 10/1959 | Taylor | 361/516 |
| 3,531,693 A * | 9/1970 | Buice | 361/516 |
| 4,245,275 A * | 1/1981 | Cannon | 361/516 |
| 4,377,404 A * | 3/1983 | Hoshikawa et al. | 65/59.22 |
| 4,523,255 A | 6/1985 | Rogers | |
| 4,780,797 A | 10/1988 | Libby | |
| 4,942,500 A * | 7/1990 | Libby et al. | 361/516 |
| 5,001,607 A | 3/1991 | Breithaupt | |
| 5,043,849 A | 8/1991 | Libby | |
| 5,105,341 A | 4/1992 | Stephenson et al. | |
| 5,369,547 A * | 11/1994 | Evans | 361/516 |
| 5,437,941 A * | 8/1995 | Arledge et al. | 429/129 |

(Continued)

FOREIGN PATENT DOCUMENTS

| | | | |
|---|---|---|---|
| DE | 2730189 A * | 1/1979 | |
| EP | 1399937 | 3/2004 | |

(Continued)

OTHER PUBLICATIONS

Vishay Sprague, Inc., PCT/US2008/057706, International Search Report, Jan. 26, 2009, 4 pages.

*Primary Examiner* — Eric Thomas
(74) *Attorney, Agent, or Firm* — Volpe and Koenig, P.C.

(57) ABSTRACT

An electrolytic capacitor includes a metal case, a porous pellet anode disposed within the metal case, an electrolyte disposed within the metal case, and a cathode element formed of an electrophoretically deposited metal or metal oxide powder of a uniform thickness disposed within the metal case and surrounding the anode. A method of manufacturing an electrolytic capacitor includes providing a metal case, electrophoretically depositing on the metal can a refractory metal oxide to form a cathode element, and placing a porous pellet anode and an electrolyte within the can such that the cathode element and the anode element being separated by the electrolyte.

9 Claims, 3 Drawing Sheets

(56) References Cited

U.S. PATENT DOCUMENTS

| | | | |
|---|---|---|---|
| 5,454,147 A | 10/1995 | Kobayashi et al. | |
| 5,469,325 A * | 11/1995 | Evans | 361/526 |
| 5,894,403 A * | 4/1999 | Shah et al. | 361/528 |
| 5,926,362 A | 7/1999 | Muffoletto et al. | |
| 5,982,609 A | 11/1999 | Evans | |
| 6,875,318 B1 | 4/2005 | Gabriele et al. | |
| 7,072,171 B1 * | 7/2006 | Muffoletto et al. | 361/508 |
| 7,483,260 B2 | 1/2009 | Ziarniak et al. | |
| 7,705,110 B2 | 4/2010 | Anderson | |
| 2004/0195093 A1 | 10/2004 | Cohen et al. | |
| 2007/0211412 A1 | 9/2007 | Fife et al. | |
| 2007/0211413 A1 * | 9/2007 | Fife et al. | 361/516 |
| 2008/0151474 A1 * | 6/2008 | Ziarniak et al. | 361/529 |
| 2008/0232030 A1 * | 9/2008 | Jones et al. | 361/503 |

FOREIGN PATENT DOCUMENTS

| | | | |
|---|---|---|---|
| FR | 2120857 A | * | 12/1972 |
| GB | 794631 | * | 5/1956 |
| JP | 10-312936 A | | 11/1998 |
| JP | 2003-522420 A | | 7/2003 |
| JP | 2003-224036 A | | 8/2003 |
| JP | 2007-243203 A | | 9/2007 |
| JP | 5-144680 B2 | | 2/2013 |
| TW | 200631973 A | | 9/2006 |
| WO | 01/57928 A1 | | 8/2001 |
| WO | WO02/103728 A1 | | 12/2002 |
| WO | WO 2006/127663 A2 | | 11/2006 |
| WO | 2007/064372 A1 | | 6/2007 |

* cited by examiner

ELECTROPHORETICALLY DEPOSITED CATHODE CAPACITOR

FIELD OF THE INVENTION

The present invention relates to wet electrolytic capacitors.

BACKGROUND OF THE INVENTION

Wet electrolytic capacitors which use carbon as the cathode have limitations such as very limited reverse voltage and low capacitance. Wet electrolytic capacitors which use an electrochemical cathode have no reverse voltage capability. Tantalum based capacitors electrical and physical properties address these limitations. Tantalum provides the most capacitance per volume of any substance. Wet tantalum capacitors presently use a liner, cylinder or sleeve for the cathode. Making and handling a thin tantalum cylinder is both difficult and expensive.

What is needed is a process and a resulting wet electrolytic capacitor, one that has all the advantages of previous art such as high capacitance, reverse voltage capability as well as very limited intrusion into the space available for anodes which allows a higher finished capacitance.

Therefore, it is a primary object, feature, or advantage of the present invention to improve over the state of the art.

It is a further object, feature, or advantage of the present invention to provide a process and wet electrolytic capacitor which allow for high capacitance, reverse voltage capability, as well as very limited intrusion into the space available for anodes which allows for a higher finished capacitance.

Yet another object, feature, or advantage of the present invention is to provide a manufacturing process for electrolytic capacitors which is efficient and uses less tantalum or other cathode material.

A still further object, feature, or advantage of the present invention is to provide a manufacturing process for electrolytic capacitors where the cathode material is easy to handle.

One or more of these and/or other objects, features, or advantages of the present invention will become apparent from the disclosure which follows.

BRIEF SUMMARY OF THE INVENTION

According to one aspect of the patent, an electrolytic capacitor is provided. The electrolytic capacitor includes a metal case, a porous pellet anode disposed within the metal case and an electrolyte disposed within the metal case. The electrolytic capacitor further includes a cathode element formed of an electrophoretically deposited refractory metal or metal oxide powder of a uniform thickness disposed within the metal case and surrounding the anode. The electrolytic capacitor also includes a first lead electrode connected to the porous pellet anode, and a second lead electrically connected to the cathode element.

According to another aspect of the present invention, a method of manufacturing an electrolytic capacitor is provided. The method includes providing a metal case, electrophoretically depositing on the metal can a refractory metal oxide to form a cathode element, and placing a porous pellet anode and an electrolyte within the can such that the cathode element and the anode element being separated by the electrolyte.

According to another aspect of the present invention, an electrolytic capacitor is provided. The electrolytic capacitor includes a metal case, a porous pellet anode disposed within the metal case, an electrolyte disposed within the metal case, and a cathode element formed of a coating having a thickness of less than 20 mils (508 μm). The capacitor also includes a first lead electrode connected to the porous pellet anode and a second lead electrically connected to the cathode element.

According to another aspect of the present invention, an electrolytic capacitor is provided. The electrolytic capacitor includes a substrate having first and second opposite second sides, a cathode element formed of an electrophoretically deposited metal or metal oxide powder of a thickness disposed on the first side, an anode disposed on the cathode element, and an electrolyte between the anode and the cathode element.

DETAILED DESCRIPTION OF THE PREFERRED EMBODIMENT

The present invention provides for an electrolytic capacitor in which a tantalum coating (or coating of another type of refractory metal or refractory metal oxide) is used as the cathode.

Figure 1:
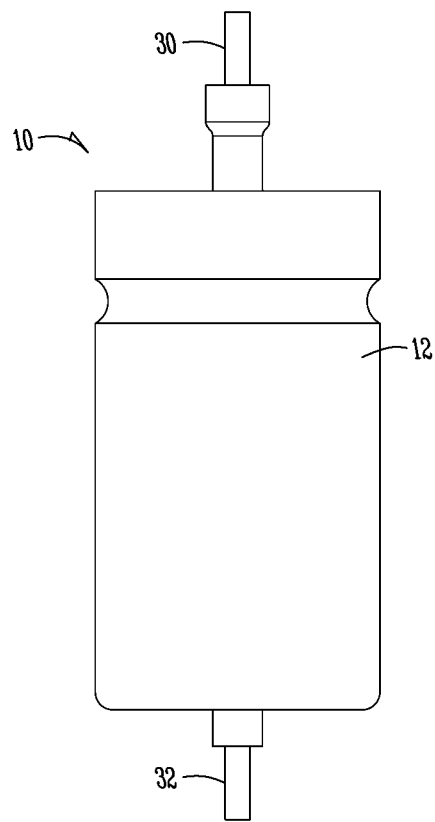
FIG. 1 represents one embodiment of capacitor of the present invention.

FIG. 1 provides a view of one embodiment of a capacitor of the present invention. In FIG. 1, the capacitor 10 has a substrate 12 which may, but need not be, in the form of a preformed case or can of a substantially cylindrical shape. A first lead 30 extends from the preformed can 12 and an opposite second lead 32 extends from the preformed can 12. FIG. 1 is merely one example of a package, and the present invention is not to be limited to the specific package shown as the present invention has broader applicability.

The capacitor 10 has a cathode which is electrophoretically deposited. The cathode thickness can vary such as from 3 mils (0.003 inches or 76.2 μm) to 20 mils (0.020 inches or 508 μm) or much thicker such as several hundred mils. The thickness used depends on the desired cathode capacitance. It is also important to recognize that the thickness achievable with electrophoretically depositing the cathode is less than that required with other known methodologies. The deposited material preferably has an electrical conductivity of more than 0.01 Siemens per cm. The deposited material may be a metal or metal oxide, preferably a refractory metal or refractory metal oxide. An electrolyte is introduced into a region of the capacitor. An anode may be is inserted into the can 12. The active area is sealed from the environment using conventional materials and methods.

Figure 2:
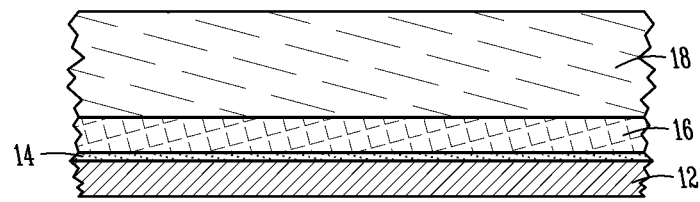
FIG. 2 is a cross-sectional view showing the cathode applied to one side.

Referring to FIG. 2 is a cross-sectional view of a capacitor of one embodiment of the present invention with a tantalum cathode. A substrate 12 with applied tantalum cathode 14 is shown. Although tantalum is one preferred material, other metals and metal oxides may be used, especially refractory metals and their oxides. The cathode thickness can vary from 3 mils (0.003 inches or 76.2 microns) to several hundred mils. The thickness depends entirely on the desired cathode capacitance. An electrolyte is introduced into region 16. An anode 18 is inserted into the case.

Figure 3:
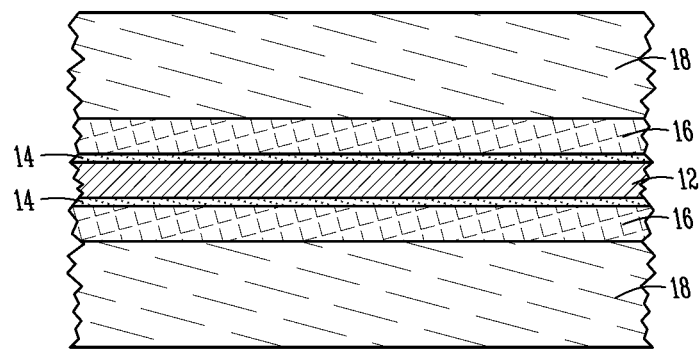
FIG. 3 is a cross-sectional view showing the cathode applied to both sides.

FIG. 3 is a cross-sectional view showing an applied tantalum cathode 14 on both sides of the substrate 12. There are electrolytes in both regions 16, and then an anode 18 also on both sides of the cross-section.

Figure 4:
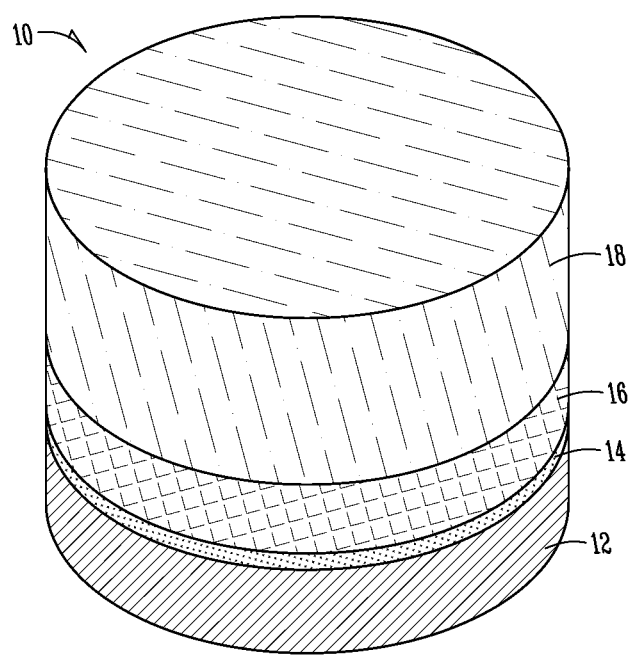
FIG. 4 is a partial perspective view of one embodiment of a capacitor.

FIG. 4 a partial perspective view of one embodiment of a capacitor.

The present invention also provides a method of manufacturing an electrolytic capacitor. A method of manufacturing an electrolytic capacitor includes providing a metal case, electrophoretically depositing on the metal case a refractory metal oxide to form a cathode element, and placing a porous pellet anode and an electrolyte within the case such that the cathode element and the anode element are separated by the electrolyte.

Electrophoretic deposition allows for a uniform coating to be applied to form the cathode element. Any number of electrophoretic deposition (EPD) techniques may be used. As previously explained, different types of materials, in particular, refractory metals and their oxides may be used. Different materials may be used depending on the desired characteristics of the capacitor, tantalum is of particular interest.

The present invention provides a number of potential advantages over prior art capacitors. For example, where tantalum is used as the cathode material, less tantalum is needed as the cathode need not be as thick. This is advantageous from a manufacturing perspective because tantalum is relatively costly. Thus, a potential cost savings can be realized where a cathode material such as tantalum is electrophoretically deposited. In addition, some types of cathodes may be difficult to handle, but not where the cathode is electrophoretically deposited. In addition, because the cathode is electrophoretically deposited, the thickness of the cathode may be reduced relative to other methods. This allows more space for the anode.

Thus, an electrophoretically deposited tantalum cathode capacitor has been disclosed. The present invention contemplates numerous variations and alternatives such as in the particular refractory metal or refractory metal oxide deposited, the capacitance of the capacitor, the electrolyte used, and other variations, options, and alternatives.

What is claimed is:

1. A method of manufacturing an electrolytic capacitor, comprising:
   providing a metal case;
   electrophoretically depositing a single uniform layer consisting only of tantalum powder on the metal case to form a cathode element, wherein the cathode element has an electrical conductivity of more than 0.01 Siemens per cm, wherein the thickness of the cathode element is less than 10 mils (254 µm); and
   placing a porous pellet anode and an electrolyte within the can such that the cathode element and the anode element are separated by the electrolyte.

2. A method of forming an electrolytic capacitor, comprising:
   placing a porous pellet anode within a metal case;
   electrophoretically depositing a cathode element on an inner surface of the metal case, the cathode element consisting of a single uniform layer consisting only of tantalum power, the cathode element having a thickness of less than 10 mils (254 µm), the cathode element having an electrical conductivity of more than 0.01 Siemens per cm, the cathode element arranged to surround the anode; and
   placing an electrolyte within the metal case such that the cathode and the anode are electrically connected by the electrolyte.

3. The method of claim 2, further comprising connecting a first lead to the anode.

4. The method of claim 3, further comprising connecting a second lead to the cathode.

5. The method of claim 2, wherein the cathode layer has a thickness of 3 mils (76.2 µm) or greater.

6. A method of manufacturing an electrolytic capacitor, comprising:
   providing a metal case;
   electrophoretically depositing a single uniform layer consisting only of tantalum powder on an inner surface of the metal case to form a cathode element, wherein the cathode element has an electrical conductivity of more than 0.01 Siemens per cm, and wherein the thickness of the cathode element is less than 10 mils (254 µm); and
   placing a porous pellet anode and an electrolyte within the case such that the cathode element and the anode element are physically separated and electrically connected by the electrolyte.

7. The method of claim 6, further comprising connecting a first lead to the anode.

8. The method of claim 7, further comprising connecting a second lead to the cathode.

9. The method of claim 6, wherein the cathode layer has a thickness of 3 mils (76.2 µm) or greater.

* * * * *